July 19, 1938.  E. GRAY  2,124,032
DOUBLE ACTING ENGINE
Filed Jan. 21, 1935  3 Sheets-Sheet 1
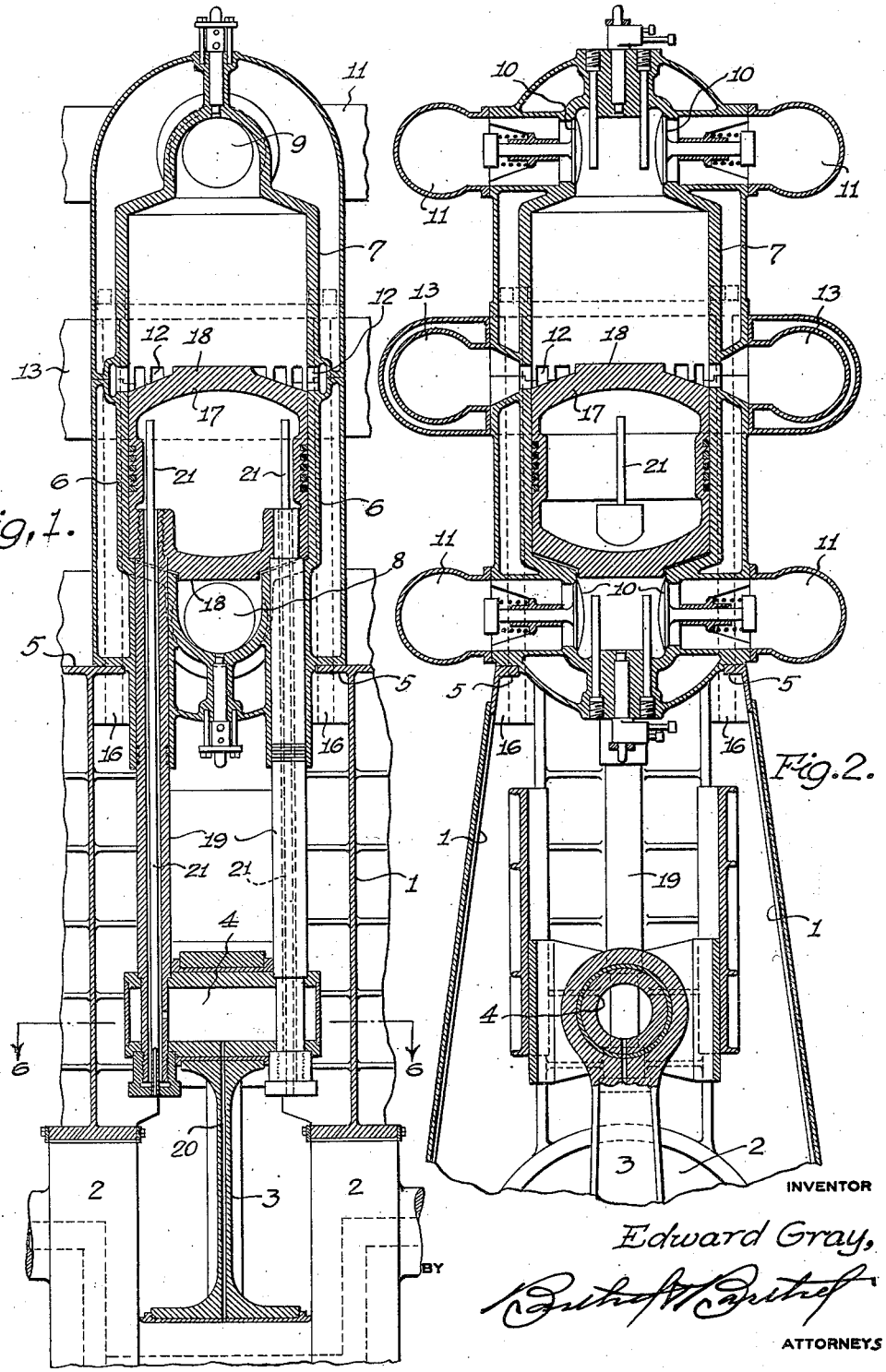
INVENTOR
Edward Gray,
ATTORNEYS July 19, 1938.  E. GRAY  2,124,032

DOUBLE ACTING ENGINE

Filed Jan. 21, 1935  3 Sheets-Sheet 2

INVENTOR
Edward Gray,
BY
ATTORNEYS

July 19, 1938.   E. GRAY   2,124,032
DOUBLE ACTING ENGINE
Filed Jan. 21, 1935   3 Sheets-Sheet 3

INVENTOR
Edward Gray,
BY
ATTORNEYS

Patented July 19, 1938

2,124,032

UNITED STATES PATENT OFFICE 2,124,032

DOUBLE ACTING ENGINE

Edward Gray, Detroit, Mich., assignor of one-half to Gar Wood, Detroit, Mich.

Application January 21, 1935, Serial No. 2,727

5 Claims. (Cl. 123—61)

This invention relates to engines and has for its object to provide an improved cylinder, combustion chamber and piston construction particularly adapted for use in a construction designed for compression ignition.

A principal object is to provide a double acting engine having substantially identically formed ignition and combustion chambers.

Another object is to provide a novel piston presenting substantially identical walls, top and bottom, to the ignition chambers of the cylinder, and to provide improved cooling thereof.

A further object is to provide an improved form of combustion chamber for use particularly with the two stroke cycle wherein better scavenging may be obtained.

A still further object is to provide an improved cylinder construction involving a placement of the common exhaust ports for the opposed cylinders at the junction thereof, integrally formed combustion chambers, improved tie means between the cylinders and the crankcase and other features, all of which will become hereinafter more fully apparent as reference is had to the accompanying drawings wherein my invention is illustrated by way of example and in which—

Figure 1 is a vertical section through one cylinder of the engine taken longitudinally of the crankshaft;

Fig. 2 is a vertical section taken axially of and normal to the view of Fig. 1;

Figure 3:
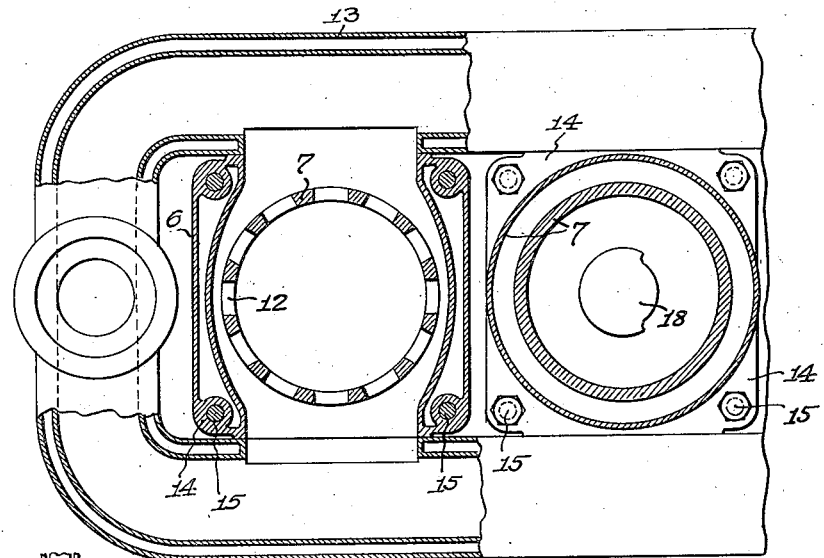
Fig. 3 is a horizontal section through the mid-section of one end cylinder, without the piston assembly, and through a plane above or below the mid-section of an adjacent cylinder showing the top of the piston, being taken along the line 3—3 of Fig. 7.
Figure 5:
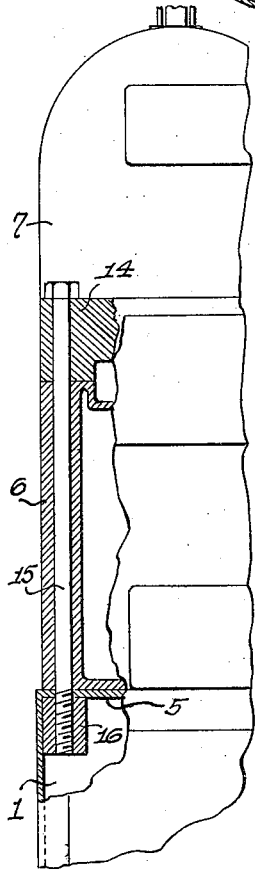
Fig. 5 is a partial side elevation of a cylinder partially broken away to show the means of bolting the cylinder parts together and to the crankcase.
Figure 4:
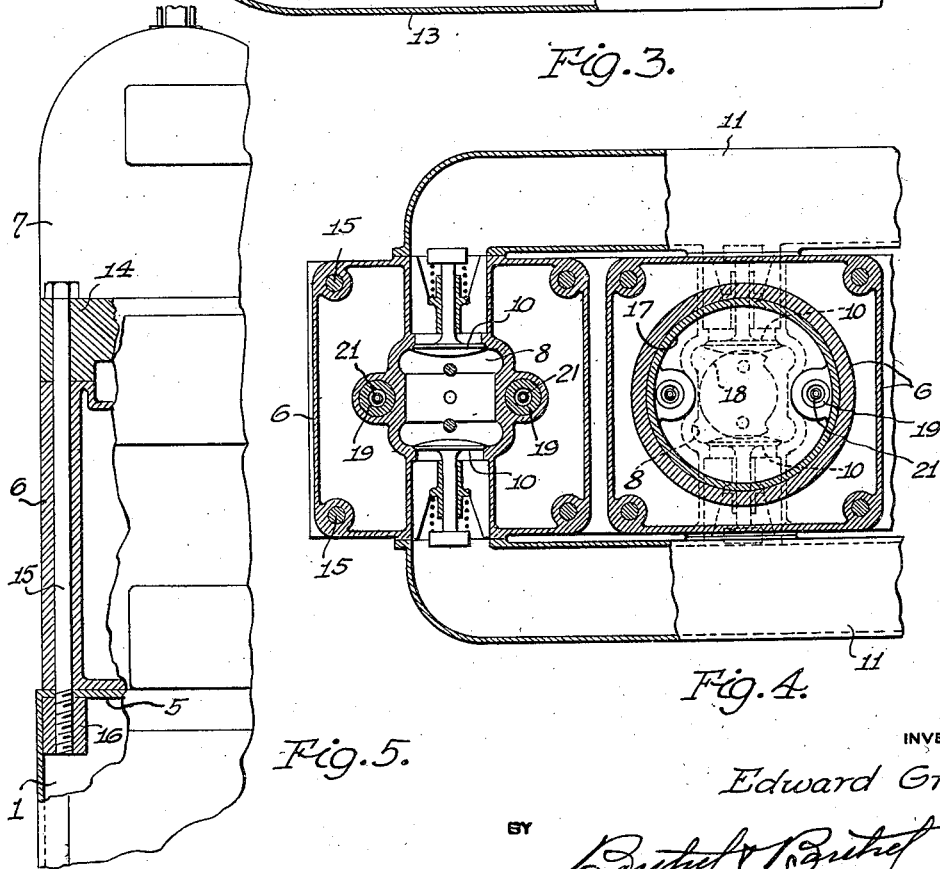
Fig. 4 is a horizontal section through one end cylinder at the inlet valves and through an adjacent cylinder below the inlet valves showing the lower combustion chamber in dotted lines and taken along the line 3—3 of Fig. 7.
Figure 7:
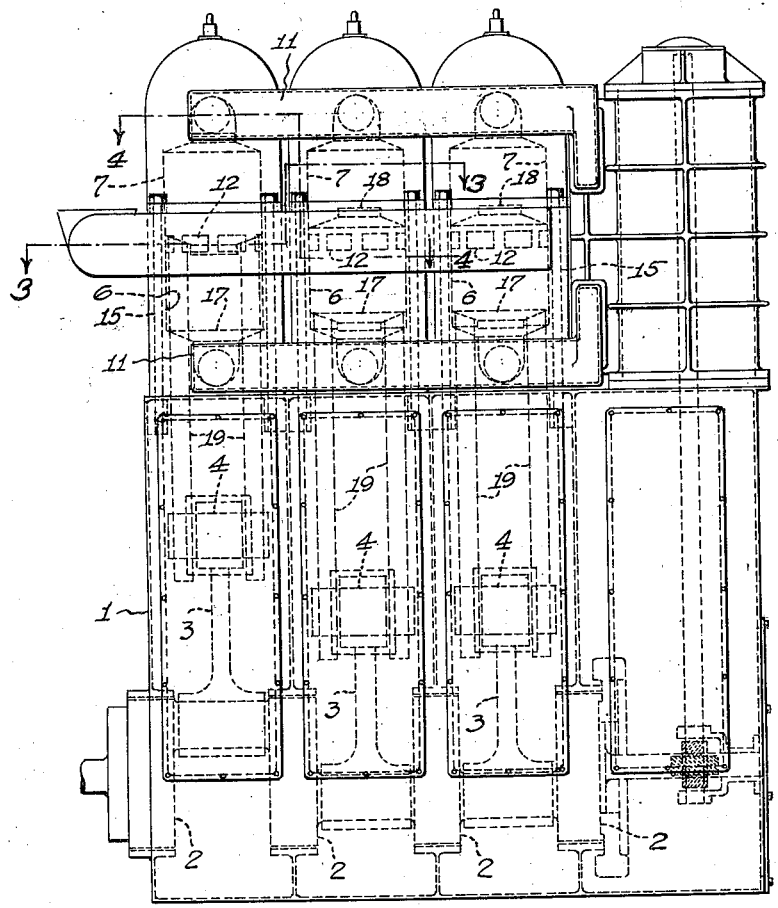
Fig. 7 is a side elevation of the engine.
Figure 6:
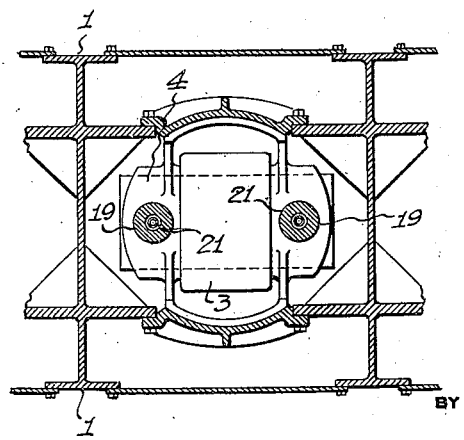
Fig. 6 is a horizontal section taken along the line 6—6 of Fig. 1.

More particularly, 1 refers to an engine crankcase having therein a crankshaft 2, and connecting rods 3 journalled to a cross arm 4. The walls of the crankcase 2 are upwardly convergent and terminate in a top portion 5 adapted to receive and support two part cylinders 6, 7.

Each of the two parts 6 and 7 have combustion chambers 8 and 9 respectively, of similar and substantially identical shape at the ends thereof having less cross-sectional area than that of the cylinders. The preferred shape of these chambers is more fully described in my co-pending application Serial No. 2726 filed January 21, 1935. Each chamber is of bulb type and has inlet valves 10 therein fed by inlet manifolds 11 whereby the bulbs may be scavenged. At the juncture of the two parts 6 and 7 are common exhaust ports 12 leading into the exhaust manifolds 13. Lateral extensions 14 have bolt holes therethrough through which the hold down bolts 15 extend for insertion into internally threaded blocks 16 integral with the crankcase 2 and adjacent the walls thereof. The bolts 15 thus tie the remote cylinder parts 7 directly to the crankcase and the tension therein is substantially, although not exactly, in the plane of the walls.

The piston 17 having similar extensions 18 on the top and bottom walls thereof is reciprocably mounted in each cylinder 6, 7. The extensions 18 are of substantially the same major diameter as the lowermost inside diameter of the combustion chambers, as is more fully described and claimed in my copending application hereinbefore referred to. Each piston 17 is hollow and has rigidly connected thereto spaced piston rods 19 each of which are hollow, and which are in turn connected to the cross member 4 with the hollow interiors thereof communicating with the pressure lubricating system 20 of said cross member 4, connecting rod 3 and crankshaft 2. Extending axially through the rods 19 and into the piston 17 are the tubes 21 of less diameter than the inside diameter of the rods 19 to constitute return conduits for the cooling lubricant conducted into the pistons through the rods. These conduits may terminate, as shown in Fig. 1, at the bottom of the rods thus releasing lubricant directly into the oil sump in the lower part of the crankcase 1.

What I claim is:—

1. In a double acting engine, a cylinder having a bulb type combustion chamber at each end thereof, said chambers being of substantially identical shape, having less cross-sectional area than said cylinders, a piston in said cylinder having similar projections on the top and bottom walls thereof, said projections having a cross-sectional area substantially that of said chambers, and piston rods rigid with said piston and extending through the bottom of said cylinder laterally spaced from the lower one of said combustion chambers.

2. In a double acting engine, a cylinder having its end walls formed with axially disposed bulb type combustion chambers having less cross sectional area than the cylinder, a piston in said cylinder, and piston rods extending through one of the end walls of said cylinder, said rods being connected to the piston at diametrically opposite points and extending through the end wall laterally spaced from the combustion chamber therein.

3. In a double acting engine, a cylinder having its end walls formed with axially disposed bulb type combustion chambers having less cross sectional area than the cylinder, a piston in said cylinder, and piston rods extending through one of the end walls of said cylinder, said rods being connected to the piston at diametrically opposite points and extending through the end wall laterally spaced from the combustion chamber therein, said chambers having diametrically opposed inlet valves opening directly thereinto, and the diametric disposition of said valves being at substantially right angles to the diametric disposition of said rods.

4. In a double acting engine, a two part cylinder, said two parts having integral end walls formed with integral combustion chambers having less cross sectional area than said cylinder, said parts having abutting ends and being substantially identical whereby the joint formed by said abutting ends is at the midpoint in the length of the cylinder, said abutting ends having common exhaust port formations, means for securing said parts together, a piston in said cylinder, and a pair of rods rigidly connected to said piston at diametrically opposite points and extending through the adjacent end wall laterally spaced from the combustion chamber therein.

5. In a double acting engine, a two part cylinder, said two parts having integral end walls formed with integral combustion chambers having less cross sectional area than said cylinder, said parts having abutting ends and being substantially identical whereby the joint formed by said abutting ends is at the midpoint in the length of the cylinder, said abutting ends having common exhaust port formations, means for securing said parts together, a piston in said cylinder, a pair of rods rigidly connected to said piston at diametrically opposite points and extending through the adjacent end wall laterally spaced from the combustion chamber therein, and diametrically opposed inlet valves opening into said combustion chambers, the diametric disposition of said valves being substantially at right angles to the diametric disposition of said rods.

EDWARD GRAY.